No. 870,834. PATENTED NOV. 12, 1907.
F. P. LINDLEY.
MOTOR BICYCLE.
APPLICATION FILED JAN. 12, 1907.
3 SHEETS—SHEET 3.
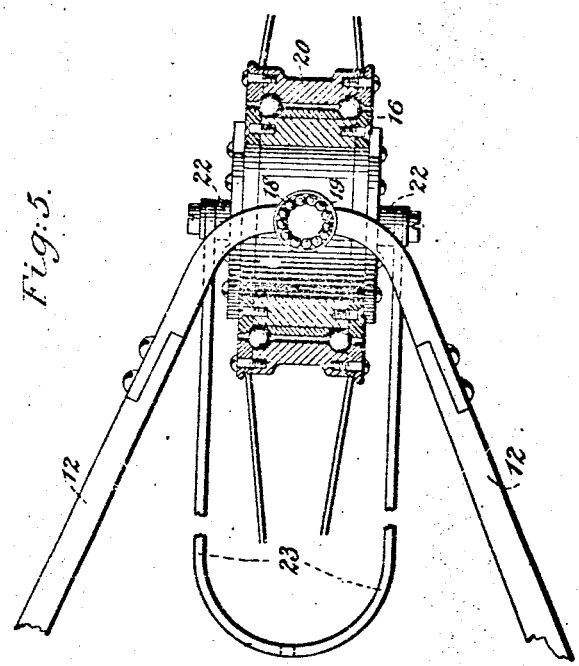
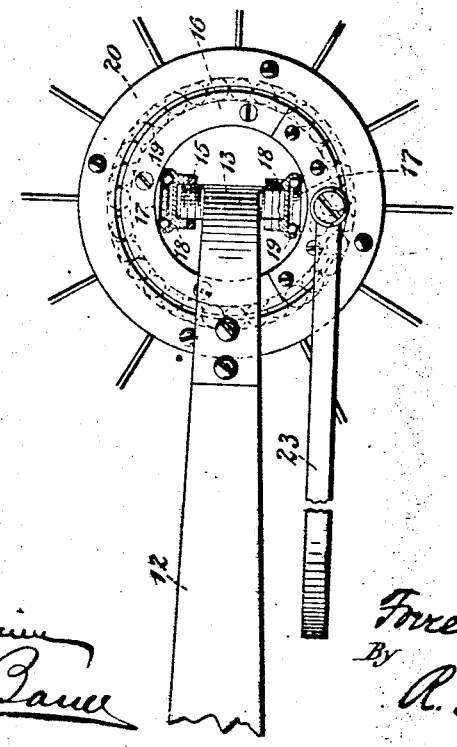
Witnesses:
Jos. F. O'Brien
Henry R. Bauer
Inventor:
Forrest P. Lindley
By R. H. E. Starr,
his Attorney.

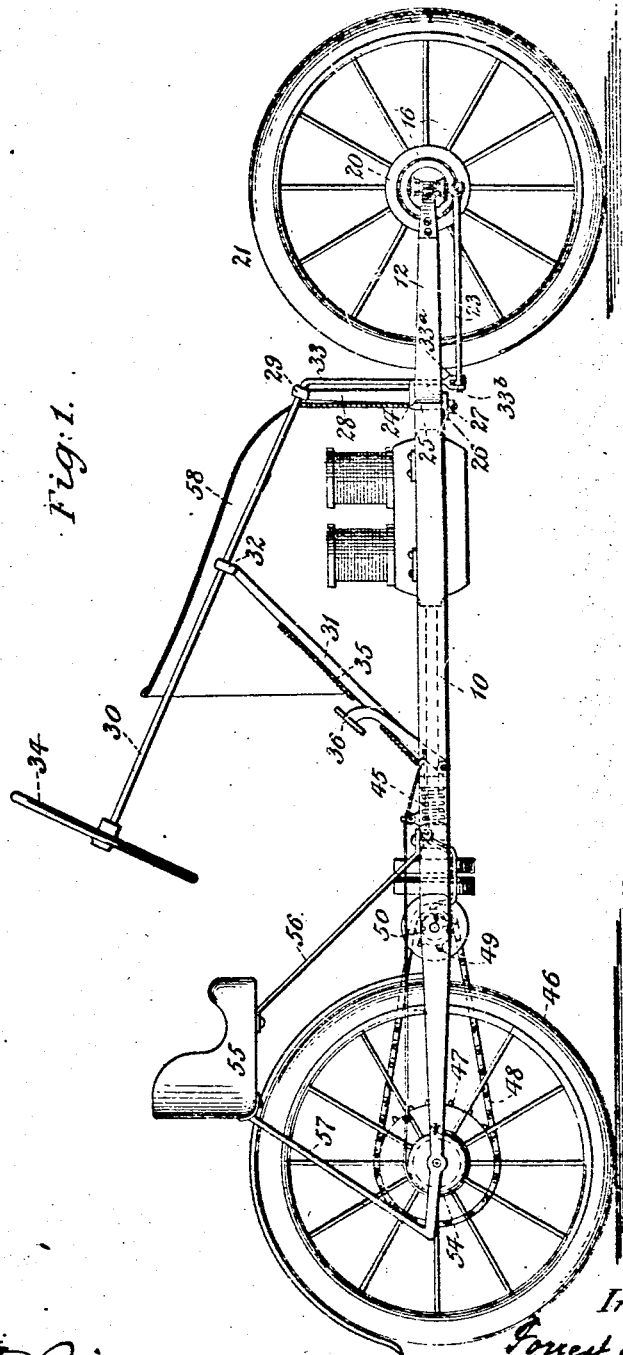

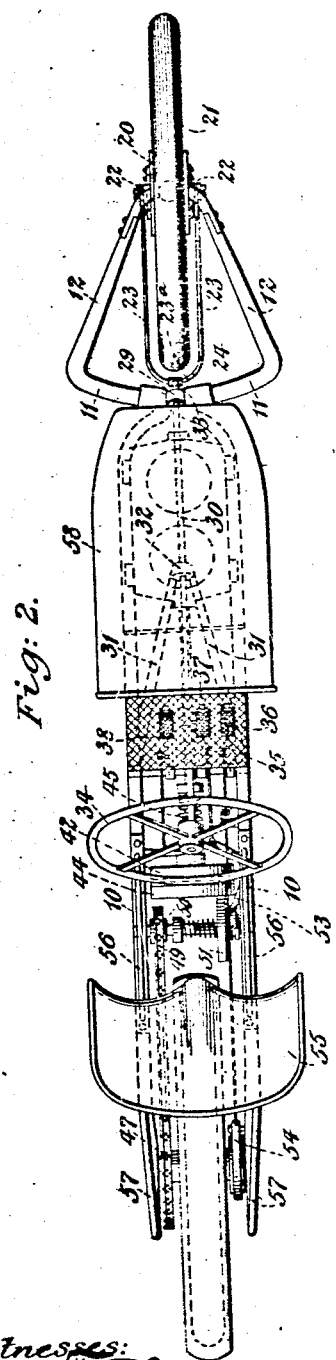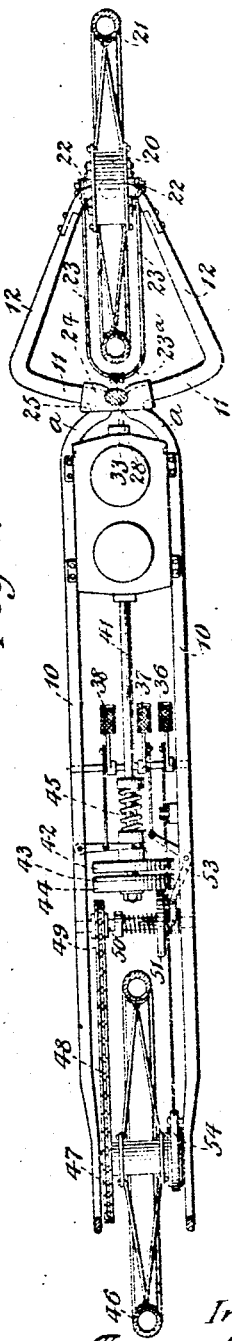

UNITED STATES PATENT OFFICE.

FORREST P. LINDLEY, OF NEW YORK, N. Y.

MOTOR-BICYCLE.

No. 870,834.   Specification of Letters Patent.   Patented Nov. 12, 1907.

Application filed January 12, 1907. Serial No. 352,040.

*To all whom it may concern:*

Be it known that I, FORREST P. LINDLEY, a citizen of the United States, and a resident of the borough of Manhattan, city of New York, county and State of New York, have invented certain new and useful Improvements in Motor-Bicycles, of which the following is a specification.

This invention relates to motor bicycles, the object being, primarily, to provide a rigid frame of simple construction in which both wheels are journaled; to dispense with the steering fork usually employed in machines of this general character and to substitute therefor improved means for steering; to increase the comfort of the rider and improve the facilities for controlling the machine, and to give the machine the general appearance of an automobile.

I will describe a preferred embodiment of my invention and then point out the novel features in claims.

In the accompanying drawings;—Figure 1 is a side elevation partly in section of a motor bicycle constructed in accordance with my invention; Fig. 2 is a top plan; Fig. 3 is a longitudinal horizontal section; Figs. 4 and 5 are enlarged detail views of the hub of the front wheel and part of the steering devices, Fig. 4 being a side elevation partly in section and Fig. 5 a sectional plan view.

The frame consists of two bars only, one on each side of the machine, and a connecting piece for their front ends. The bars are indicated by 10—10, and they extend substantially parallel to each other from the driving wheel to just in the rear of the steering wheel; where as shown they are bent inwardly toward each other as at a, and then outwardly to form the curved base 11 of a triangular shaped front portion of the frame, the sides 12 of which converge toward their front ends where they are detachably secured to the connecting piece 13. One half the steering wheel projects into this triangular shaped front portion and the wide end thereof affords ample room for the movement of the wheel to effect the steering.

A pin or post 15 is firmly secured in the connecting piece 13 in the central longitudinal line of the machine, and forms a pivot about which the front wheel may be turned. A ring or collar 16 is provided with diametrically opposite cones 17—17 which project into ball cups 18—18 screwed on the ends of the post 15, and balls 19 are interposed between the respective cones and cups. The hub 20 of the front or steering wheel 21 surrounds the collar 16 and two series of antifriction balls 2 are interposed between the hub 20 and ring 16, as clearly shown in Figs. 4 and 5. The wheel can thus rotate freely on the ring 16 which constitutes its axle, but the latter is held against rotary motion in the same direction by reason of its connection to the post 15. The ring 16 can, however, turn about the post horizontally and on account of the ball bearings between the ring and the hub the wheel will also turn with the ring about the post.

From the lower portion of the ring 16 a lug or pin 22 projects on each side on which the ends of a U-shaped lever 23 are pivotally secured to permit the rear or loop portion 23ª to have vertical movement. Obviously, by moving the lever 23 to the right or left the ring 16 and wheel 21 will be turned about the post 15, and steering be thus effected.

At the converging portions *a* of the frame bars I provide a clamp plate 24 from which two bolts 25 extend downwardly through a bottom tie-plate 26 and a nut 27 is threaded on the lower end of each bolt,—engages the tie-plate 26 and thereby clamps the plate 24 firmly in position. From the plate 24 a post or standard 28 extends vertically and is provided at its upper end with an eye 29 through which the steering rod 30 extends.

Two braces 31—31 are rigidly secured at their lower ends to the bars 10—10 from which they extend upwardly and forwardly at an inclination with their upper ends converging and being joined to an eye 32 through which the steering rod 30 also extends. The post 28 and the braces 31 firmly support the steering rod and it fits in the eyes 29 and 32 snugly but so as to turn freely therein. Just in front of the eye 29 the rod 30 is bent downward to form an arm 33 which is provided with a fork 33ª at its lower end to straddle the loop end of the lever 23 and to which it is connected by a bolt or pin 33ᵇ. The rear end of the steering rod 30 is provided with a hand wheel 34.

The braces 31 serve also as supports for a foot rest or platform 35 through which levers, carrying treadles 36, 37 and 38, extend in position to be operated by the feet of the rider.

The motor is indicated by 40 and may be of any type desired, such as an electric motor, gas or oil engine, etc. In the structure shown it is intended to rotate the driving shaft 41 provided near its outer end with a friction disk 42. This disk is splined to the shaft 41 and is adapted to be moved longitudinally on the shaft 41 to engage a ring 43, of any suitable fiber, mounted loosely on the shaft 41 and to force said ring into tight contact with the disk 44 also loosely mounted on the shaft 41. A spring 45 tends normally to keep the disk 42 in engagement with the ring 43 and the treadle 38 is for the purpose of forcing it out of engagement with said ring.

The rear wheel is indicated by 46 and is journaled in the rear end portions of the bars 10—10. It is provided with a sprocket wheel 47, which is connected by a chain 48 with a sprocket wheel 49 on the shaft 50. On the shaft 50 a disk 51 is splined, the periphery of which engages the face of the disk 44. A spring 52 tends normally to hold the disk 51 at its outermost position and a bell-crank lever 53, connected at one end to the hub of the disk 51 and at its other end to the treadle 37, may be operated to move the disk 51 towards the center of the disk 44 and thereby effect a reduction of the speed with which the wheel 46 is driven. A friction brake 54 is also provided for the rear wheel and is connected to be operated by the foot treadle 36. It will thus be seen that the shaft 41 can run idle, and the rider by operating the treadle 38 can control the application of the power to drive the machine, and by operating the treadle 37 he can vary the speed. Obviously other forms of driving mechanism may be employed as well as other forms of change speed gearing, and while that which is illustrated and described is one of my preferred forms, I do not restrict myself thereto.

The seat is indicated by 55 and is supported by braces 56 extending forwardly and downwardly therefrom to the side bars 10 and by the rear braces 57—57 which may conveniently be integral portions of the bars 10—10, reduced in thickness and bent upwardly as indicated in Figs. 1 and 2.

A hood 58 is secured to the frame in any suitable manner and serves as a protection for the motor and also, to some extent, for the platform 35.

The controlling mechanism for the motor may be arranged in any suitable manner but, as this forms no part of the present invention, I have not deemed it necessary to illustrate or particularly describe any special devices therefor.

From the foregoing description, taken in connection with the drawings, it will be seen that I produce an absolutely rigid frame, of very simple construction, in which both wheels are journaled and that the ordinary steering fork is dispensed with and improved steering mechanism provided which can be easily operated by the rider while sitting in a comfortable position on the machine. It will also be seen that the machine very closely resembles an automobile in general outline and forms a comfortable and easily controlled machine.

It is not essential that the bars 10—10 be bent inwardly to form the portions a—a, for obviously they could extend straight to their junction with the outwardly bent portions 11. In such event, a longer clamp or tie plate 24 would be necessary and such plate might be secured to the bars 10—10 otherwise than as shown.

While I have illustrated and described a triangularly shaped portion at the front end of the frame because at this time I believe it preferable for many reasons, it is not absolutely essential. Of course, this portion of the frame must be open to receive the rear half of the steering wheel and of sufficient width at its rear end to permit the necessary movement of the wheel to effect the steering. It is desirable to keep the frame as narrow as possible and generally it will be necessary to have the rear end of the open front portion of the frame somewhat wider than the rear portion of the frame. By having the front portion shaped as shown, there is obviously less wind resistance than would be the case if such portion was rectangular, for example. Therefore I do not limit myself to a triangularly shaped section for the front portion of the frame, but reserve the right to make it of any other suitable form.

Having described my invention, I claim:

1. In a motor bicycle, a rigid frame consisting of two parallel bars and a forwardly tapering portion rigidly connected to the front ends of the bars, combined with a pin secured in the narrow front end of the tapering portion, a steering wheel pivotally supported on said pin, a driving wheel journaled between the parallel bars, a motor supported on said bars, connections between the motor and driving wheel, and steering mechanism supported by said bars and connected to the steering wheel.

2. In a motor bicycle, a rigid frame consisting of a pair of substantially parallel bars and a tapering front portion connected to said bars, combined with a pin secured in the narrow front end of the tapering portion, a steering wheel pivotally supported on said pin to turn horizontally thereon, a driving wheel journaled between said parallel bars, and steering devices supported by said bars and connected to the steering wheel.

3. In a motor bicycle a rigid frame consisting of two parallel bars and a forwardly tapering portion rigidly connected to the front ends of the bars, combined with a pin secured in the narrow front end of the tapering portion, and a steering wheel pivotally supported on the pin to turn horizontally thereon with its front portion projecting beyond the frame and its rear portion within the tapering portion of the frame.

4. In a motor bicycle, a rigid frame having a rear portion formed of a pair of substantially parallel bars and a tapering front portion rigidly connected to said bars, combined with a pin secured in the narrow front end of the tapering portion, a collar pivotally supported on the pin to turn horizontally thereon, a steering wheel journaled on said ring, a driving wheel journaled between said parallel bars, and means for turning said ring and steering wheel on the said post.

5. In a motor bicycle, a rigid frame comprising a triangularly shaped front portion and two parallel bars extending rearwardly from the front portion, a driving wheel journaled between said bars, a steering wheel connected to the front portion to rotate and turn laterally therein, a motor supported on said parallel bars, connections between the motor and driving wheel, a seat supported by said bars over the driving wheel, a steering rod connected to the steering wheel and extending rearwardly in proximity to the seat and a hand wheel on the rear end of the said rod.

6. In a motor vehicle, the combination with a frame, of a pin secured therein, ball cups on the ends of the pin, a ring having oppositely disposed cones which project into the cups, balls between the cones and cups, a steering wheel journaled on the ring, and steering devices supported by the frame and connected to said ring.

7. In a motor vehicle, the combination with a frame, of a pin secured therein and having threaded ends, ball cups screwed on the ends of the pin and adjustable thereon, a ring having oppositely disposed cones which project into said cups, balls between the cones and cups, a steering wheel journaled on the ring, and steering devices supported by the frame and connected to the ring.

8. In a motor vehicle, the combination with the frame, of a pin secured therein, a ring pivoted on the ends of the pin and extending laterally therefrom on each side, a steering wheel journaled on said ring, an arm connected to said ring and extending rearwardly therefrom, a steering rod supported on the frame and provided with a hand wheel, and connections between the said rod and arm.

In witness whereof, I have signed my name to the foregoing specification in the presence of two subscribing witnesses.

FORREST P. LINDLEY.

Witnesses:
Jos. F. O'Brien,
H. K. Baker.